United States Patent
Alzahrani et al.

(10) Patent No.: US 10,887,105 B2
(45) Date of Patent: Jan. 5, 2021

(54) BIOSHARES: APPLY SHAMIR SECRET SHARING TO SECURE FINGERPRINT IN THE CLOUD

(71) Applicant: King Abdulaziz University, Jeddah (SA)

(72) Inventors: Bayan Taha Alzahrani, Jeddah (SA); Fahad Jazi Alsolami, Jeddah (SA)

(73) Assignee: King Abdulaziz University, Jeddah (SA)

(*) Notice: Subject to any disclaimer, the term of this patent is extended or adjusted under 35 U.S.C. 154(b) by 127 days.

(21) Appl. No.: 16/375,418

(22) Filed: Apr. 4, 2019

(65) Prior Publication Data

US 2020/0322156 A1    Oct. 8, 2020

(51) Int. Cl.
| | | |
|---|---|---|
| H04L 29/00 | (2006.01) | |
| H04L 9/32 | (2006.01) | |
| G06K 9/00 | (2006.01) | |
| G06F 16/22 | (2019.01) | |
| H04L 9/08 | (2006.01) | |

(52) U.S. Cl.
CPC ........ *H04L 9/3231* (2013.01); *G06F 16/2282* (2019.01); *G06K 9/00087* (2013.01); *H04L 9/085* (2013.01)

(58) Field of Classification Search
CPC .......... G06F 21/32; G06F 21/34; G06F 21/35; G06F 21/31; G06F 21/6245
See application file for complete search history.

(56) References Cited

U.S. PATENT DOCUMENTS

| | | |
|---|---|---|
| 2009/0016573 A1 | 1/2009 | McAfee, II et al. |
| 2011/0010558 A1 | 1/2011 | Belden et al. |
| 2013/0173927 A1* | 7/2013 | Tian ................ G06K 9/00093 713/186 |

FOREIGN PATENT DOCUMENTS

CN       101777128 A       7/2010

OTHER PUBLICATIONS

F. Bayatbabolghani, et al., "Secure Fingerprint Alignment and Matching" Dec. 19, 2017, pp. 1-40.

* cited by examiner

*Primary Examiner* — Ghazal B Shehni
(74) *Attorney, Agent, or Firm* — Oblon, McClelland, Maier & Neustadt, L.L.P.

(57) ABSTRACT

A secure fingerprint identification system and method, includes storing n shares of transformed gallery pair tables for each person into n cloud computer systems, each of the transformed gallery pair tables is generated by transforming first biometric input into first transformed data, determining an integer part and a fraction part using the first transformed data, splitting the integer part into the n shares and determining a threshold number. Data for a probe pair table is used to obtain a second biometric input, which is transformed into second transformed data. A probe integer part and a probe fraction part are determined using the second transformed data. The threshold number of the gallery pair tables is downloaded from the clouds. The integer part is reconstructed from the threshold shares. Matching is performed including exactly matching the probe integer part and the reconstructed integer part and matching the fraction parts within a threshold.

20 Claims, 12 Drawing Sheets

BIOSHARES: APPLY SHAMIR SECRET SHARING TO SECURE FINGERPRINT IN THE CLOUD

BACKGROUND

Technical Field

The present disclosure relates generally to secure fingerprint recognition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fingerprints have been used for identification purposes since the 19$^{th}$ century, particularly for identification of criminals, forensics, and immigration. More recently, fingerprints are being used for user authentication in order to access cellphones, laptops, digital storage devices, and physical building or room access. In each of these cases, fingerprint data is being stored either in central databases or in user devices, or both. Reports have shown that fingerprint databases may not be sufficiently protected from unauthorized access. Unlike passwords, if a fingerprint database is comprised or improperly shared, the underlying fingerprint data cannot be changed. Data patterns that represent a fingerprint are themselves unique, and any change to the data patterns would no longer correlate to the original fingerprint. Furthermore, a compromised fingerprint cannot be replaced. In other words, the fingerprint data is so sensitive that if it were to be revealed or stolen the victim may be vulnerable to impersonation attacks.

One solution has been to not store the original fingerprint, but instead store some cancelable token generated from it. Even in the case of cancelable tokens, there is still a strong motivation for secure fingerprint recognition protocols that protect a fingerprint database from being compromised.

Fingerprint features used in a fingerprint recognition system can be categorized into three types: arch, loop and whorl. There are several techniques used to match fingerprints, including orientation ridge flow, minutiae point, and ridge contour. See A. K. Jain, K. Nandakumar, and A. Ross, "50 years of biometric research: Accomplishments, challenges, and opportunities," Pattern Recognit. Lett., vol. 79, pp. 80-105, August 2016, incorporated herein by reference in its entirety. A minutiae-based structure is a commonly used feature since the minutiae point has a unique structure that makes each fingerprint image distinct from others in the recognition system. In fact, the minutiae point can be indicated by the ridge bifurcation or ridge ending. See C. I. Watson et al., User's Guide to NIST Biometric Image Software (NBIS). 2007, incorporated herein by reference in its entirety. A bifurcation is the point or area in which the ridge divides into two branches or parts while a ridge ending is the point in where the ridge line is terminated, as shown in FIG. 1A. Also, FIG. 1B illustrates the ridge ending indicated by a circle and the bifurcation indicated by a square. However, the orientation and coordinate location of the ridge for all minutiae points need to be extracted to match the fingerprints. Fingerprint matching may be performed using the NIST Bozorth matcher. See C. I. Watson et al.

The NIST Bozorth matcher is a minutiae-based fingerprint matching algorithm. The natural form of the Bozorth algorithm generates the minutiae point by a Minutiae Detection (MINDTCT) algorithm. The MINDTCT algorithm has been used to locate the minutiae points and other details in the fingerprint images. The MINDTCT algorithm takes the fingerprint image from the sensor and extracts all minutiae in that image. After that, a minutiae file is created for all the minutiae points of the particular fingerprint. For each minutiae point, the algorithm assigns the location of minutiae on the fingerprint image (x coordinate, y coordinate), the orientation angle ($\theta$), and the quality (q). An example of a minutiae file as illustrated in Table 1.1.

After creating the minutiae file for each fingerprint image, the matching algorithm performs three major steps:

1. Construct a pair table with the values ($d_{kj}$, $\beta_1$, $\beta_2$, k, j, $\theta_{kj}$) as illustrated in FIG. 1C. The system takes each pair of minutiae and generates an entry in the pair table for them. Each pair table entry stores seven elements of information where the distance between the minutiae pair (k, j) is $d_{kj}$, $\beta_1$ and $\beta_2$ are the angles of each minutiae with respect to the line between them, and $\theta_{jk}$ is the orientation of the line between the two minutiae points. The pair table stores the entries of the minutiae pair according to the distance between the minutiae pair (k, j) from small to the large distance. The algorithm in this step, constructs a pair table of the probe fingerprint (fingerprint image being tested) and one table of each gallery fingerprint (fingerprint images stored in a database) to be matched. An example of the pair table entries as illustrated in Table 1.2.

2. Construct a match table, wherein the algorithm compares each entry in the pair table of probe against each entry in tables of all gallery fingerprint. The algorithm generates the match table for compatible entries between the probe and the gallery in which the distances and the angles between them are within a given threshold as shown in FIG. 1D. Each row in the match table includes one pair from a gallery pair table and the corresponding pair from a probe pair table with the difference in the angle between them. An example of entries in the match table as illustrated in Table 1.3.

3. Create links between nodes in the match table by traversing into the rows of the table to form clusters. The algorithm uses these clusters to compute the final score of matching to determine if both the gallery fingerprint image and the probe fingerprint image are related to the same person or not.

TABLE 1.1

Example of a Minutiae File That Contains All the Minutiae Points of a Particular Fingerprint. This Minutiae File from FV_C2002Db2_a.

| Minutiae Points | X Coordinate | Y Coordinate | θ Orientation Angle | Quality |
|---|---|---|---|---|
| MP 1 | 48 | 86 | 5 | 19 |
| MP 2 | 63 | 104 | 159 | 81 |
| MP 3 | 85 | 37 | 56 | 89 |
| MP 4 | 56 | 48 | 67 | 88 |
| MP 5 | 35 | 178 | 180 | 39 |
| MP 6 | 84 | 209 | 40 | 29 |
| MP 7 | 71 | 72 | 135 | 21 |
| MP 8 | 28 | 196 | 169 | 34 |
| ... | ... | ... | ... | ... |
| MP n | 198 | 132 | 86 | 79 |

See D. Maltoni, Ed., *Handbook of fingerprint recognition*, 2nd ed. London: Springer, 2009, incorporated herein by reference in its entirety.

TABLE 1.2

Example of a Pair Table That Contains the Minutiae Pair of Particular Fingerprint Image. This Pair Table from FV C2002Db2_a Dataset.

| Rows of Pairs | Distance | Angle $\beta_1$ | Angle $\beta_2$ | Angle $\theta$ | Minutiae Indices k | Minutiae Indices j | Quality |
|---|---|---|---|---|---|---|---|
| Pair 1 | 61 | 54 | 72 | 84 | 4 | 4 | 20 |
| Pair 2 | 199 | 92 | 28 | 379 | 3 | 2 | 20 |
| Pair 3 | 552 | −108 | −125 | 57 | 3 | 4 | 18 |
| Pair 4 | 931 | −178 | −12 | 4 | 4 | 3 | 42 |
| Pair 5 | 1257 | 64 | 132 | 248 | 2 | 8 | 17 |
| ... | ... | ... | ... | ... | ... | ... | ... |
| Pair n | 14320 | −172 | 15 | 137 | 37 | 26 | 38 |

See D. Maltoni, Ed., *Handbook of fingerprint recognition*, 2nd ed. London: Springer, 2009, incorporated herein by reference in its entirety.

TABLE 1.3

Example of the Entries in the Match Table. This Match Table from FV C2002Db2_a Dataset.

| Rows | $\Delta(\theta(\text{Probe}), \theta(\text{Gallery}))$ | Probe Minutiae Indices k | Probe Minutiae Indices j | Gallery Minutiae Indices k | Gallery Minutiae Indices j |
|---|---|---|---|---|---|
| Row 1 | 59 | 1 | 2 | 4 | 10 |
| Row 2 | −25 | 1 | 4 | 5 | 9 |
| Row 3 | −1 | 2 | 8 | 8 | 11 |
| Row 4 | 20 | 3 | 5 | 11 | 5 |
| Row 5 | 116 | 4 | 7 | 11 | 9 |
| ... | ... | ... | ... | ... | ... |
| Row n | −153 | 8 | 9 | 7 | 14 |

See D. Maltoni, Ed., *Handbook of fingerprint recognition*, 2nd ed. London: Springer, 2009, incorporated herein by reference in its entirety.

SUMMARY

In an exemplary embodiment, a secure fingerprint identification method, includes storing n shares of original transformed gallery pair tables for each of one or more persons into n cloud computer systems, where n is a natural number of one or more, each of the original transformed gallery pair tables is generated using a client computer including creating fingerprint minutiae points based on a person's fingerprint, for each row in the transformed gallery pair table, obtaining a first biometric input v, defined as a distance d between a minutiae pair and angles $B_1$ and $B_2$ of each pair of minutiae points, transforming the first biometric input into first transformed data v' using transform parameters, determining an integer quotient part and a residual of a fraction part using the first transformed data v', applying a secret-sharing scheme to the integer quotient part that splits the integer quotient part into the n shares and determines a threshold number of shares, and inserting one share of the integer quotient part into the respective row of one share of the original transformed gallery pair table; collecting, with a user's computer, data for a probe pair table; generating, with the user's computer, the probe pair table including for each row in the probe pair table, obtaining a second biometric input v, defined as distance d between minutiae pair and angles $B_1$ and $B_2$ of each pair of minutiae points, transforming the second biometric input into second transformed data v' using the transform parameters, determining a probe integer quotient part and a probe fraction part using the second transformed data v; downloading the threshold number of the n shares of the transformed gallery pair tables for each of the one or more persons stored in the n clouds; applying, using a server computer, the secret-sharing scheme to reconstruct the integer quotient part from the threshold number of shares of the integer quotient part; and matching, using the server computer, the probe pair table against the transformed gallery pair tables for the one or more persons, including exactly matching the probe integer quotient part and the reconstructed integer quotient part, wherein a match with one person's gallery pair table identifies the user's fingerprint.

In another exemplary embodiment, a secure fingerprint identification system, includes n cloud computer systems storing n shares of original transformed gallery pair tables for each of one or more persons; a client computer configured to create a transformed gallery pair table based on a minutiae file for each person's fingerprint of the one or more persons, for each row in the original transformed gallery pair table, obtain a first biometric input v, defined as distance d between a minutiae pair and angles $B_1$ and $B_2$ of each minutiae pair, transform each first biometric input into first transformed data v' using transform parameters, determine an integer quotient part and a residual of a fraction part using the first transformed data v'; and a server computer configured to, for each row of the original transformed gallery pair table, apply a secret-sharing scheme to the integer quotient part that splits the integer quotient part into the n shares and determines a threshold number of shares, and insert one share of the integer quotient part into a respective row of one share of the original transformed gallery pair table; a user's computer collecting data for one probe pair table including an integer part and a fraction part, the probe pair table is generated using the user's computer by for each row in probe pair table, obtaining a second biometric input v, defined as distance d between minutiae pair and angles $B_1$ and $B_2$ of each minutiae pair, and transforming each second biometric input v into second transformed data v' using transform parameters, and determining a probe integer quotient part and a probe fraction part using the second transformed data v'; the server computer downloading the threshold number of the n shares of the transformed gallery pair tables for each of the one or more persons stored in the n clouds; applying the secret-sharing scheme to reconstruct the integer quotient part from the threshold number of shares of the integer quotient part; and matching the probe pair table against the gallery pair tables for the one or more persons, exactly matching the probe integer quotient part and the reconstructed integer quotient part, wherein a match with one person's gallery pair table identifies the user's fingerprint.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
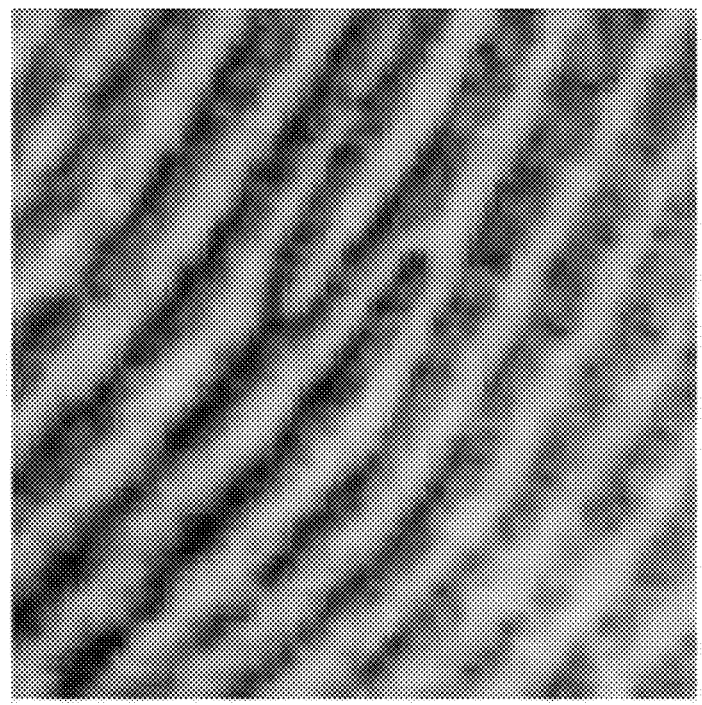
FIGS. 1A and 1B illustrate the minutiae point: ridge ending (indicated by the circle), bifurcation (indicated by the square)
Figure 1B:
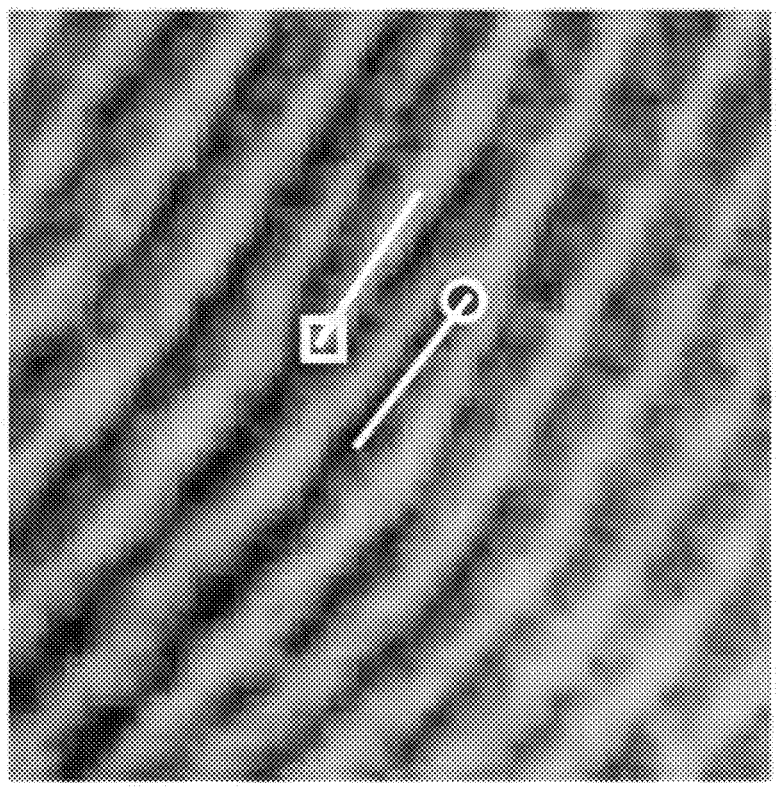
Figure 1C:
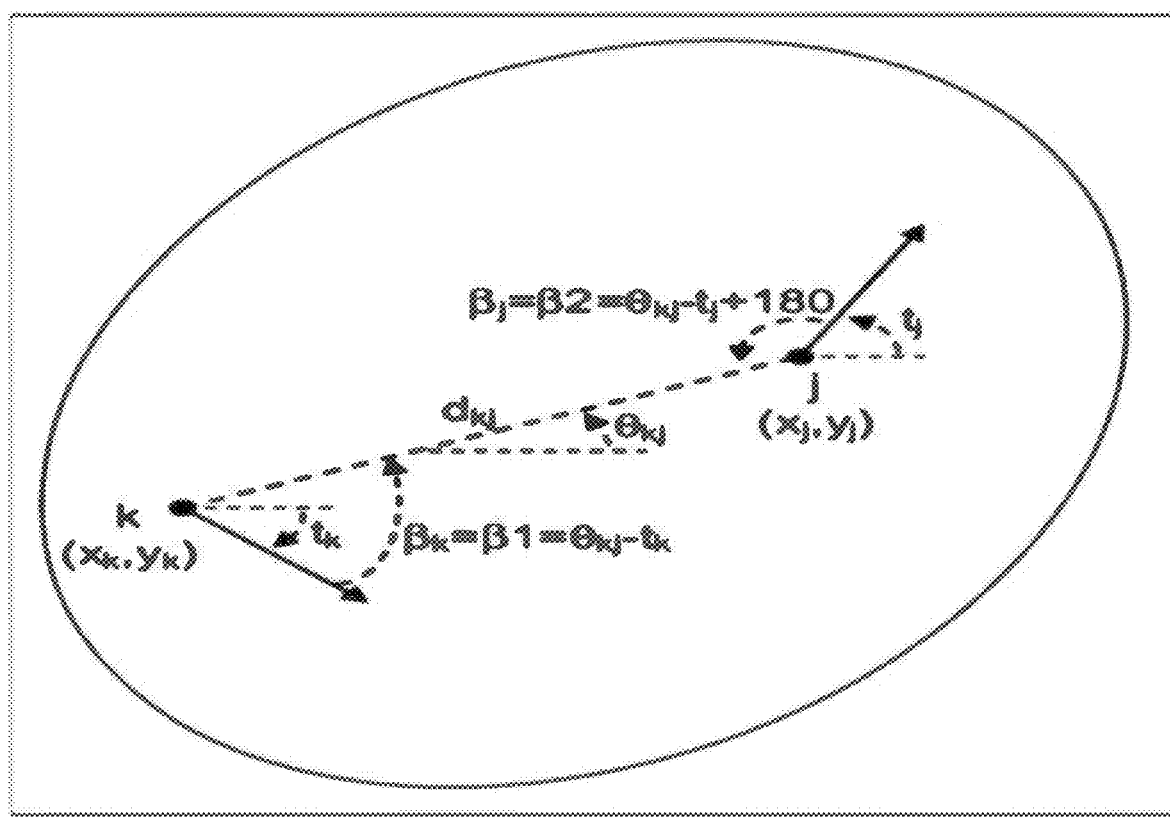
FIG. 1C illustrates the distance between two minutiae points (k, j) with (β1, β2, θkj) angles on a fingerprint image.
Figure 1D:
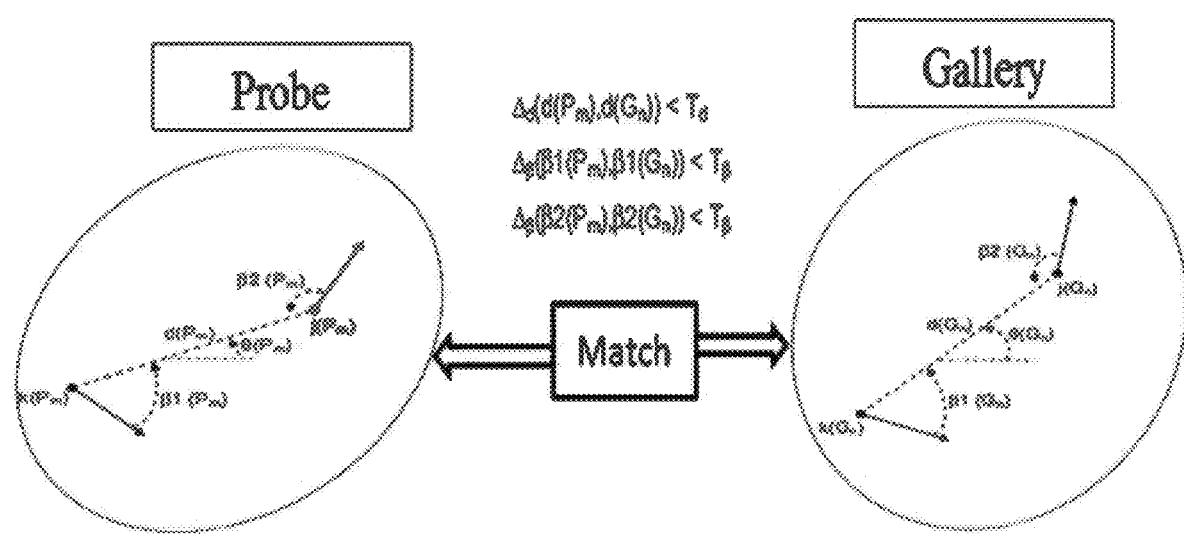
FIG. 1D illustrates the match between two fingerprints in the NIST algorithm.

In the drawings, like reference numerals designate identical or corresponding parts throughout the several views. As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Aspects of this disclosure are directed to an enrollment operation that is performed using a revocable transform and a portion of the result of the revocable transform is securely stored in databases in multiple clouds such that a compromised database in up to a threshold number of the multiple clouds will not result in revealing any original fingerprints.

Figure 2:
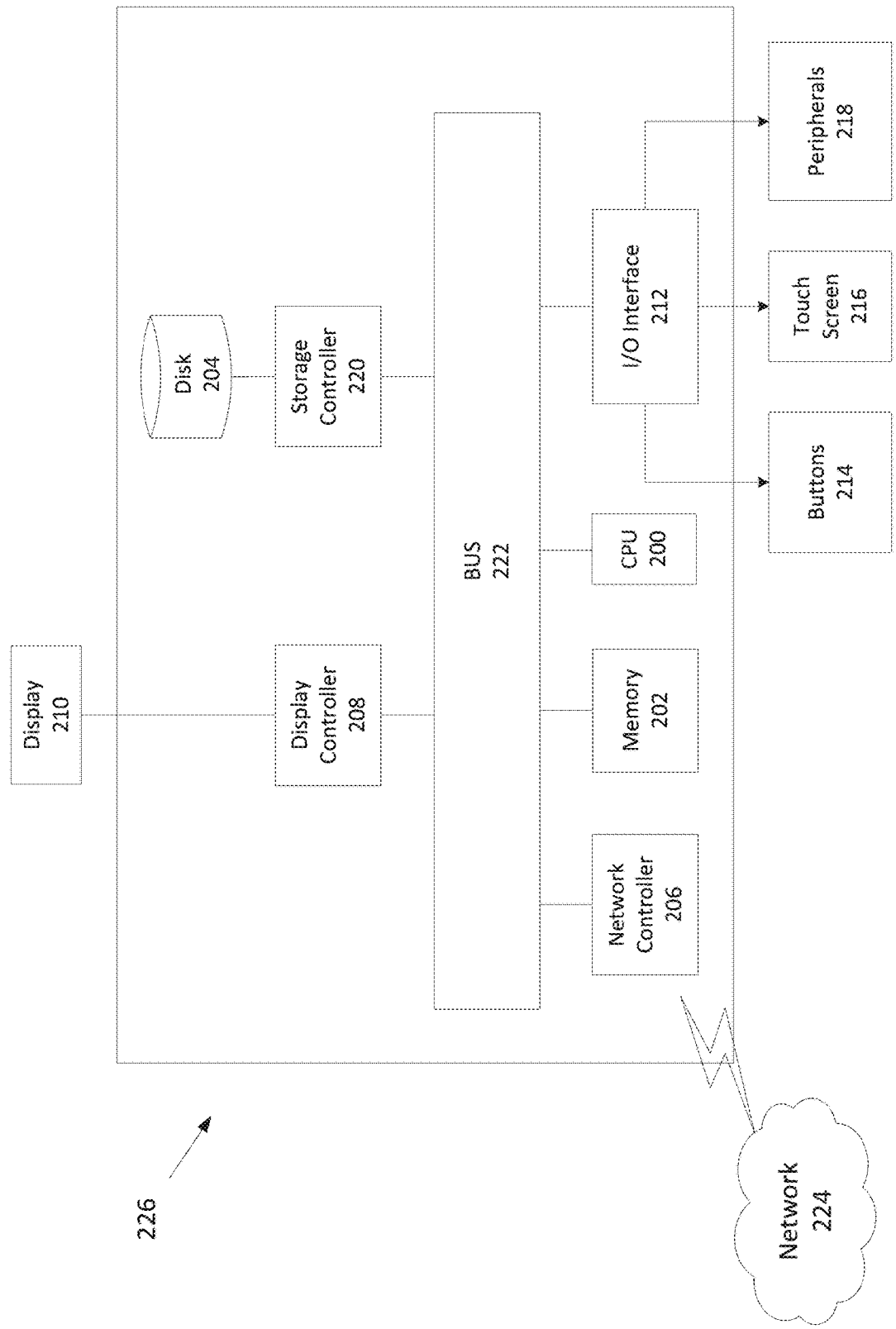
FIG. 2 illustrates a computer system in accordance with an exemplary aspect of the disclosure.

In one implementation, the functions and processes may be implemented by a computer 226. A hardware description of the computer 226 according to exemplary embodiments is described with reference to FIG. 2. In FIG. 2, the computer 226 includes a CPU 200 which performs the processes described herein. The process data and instructions may be stored in memory 202. These processes and instructions may also be stored on a storage medium disk 204 such as a hard disk drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 226 communicates, such as a server or computer.

Further, the claimed advancements may be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In order to achieve the computer 226, the hardware elements may be realized by various circuitry elements, known to those skilled in the art. For example, CPU 200 may be a Xenon® or Core® processor from Intel Corporation of America or an Opteron® processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The computer 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 226 further includes a display controller 208, such as a NVIDIA® GeForce® GTX or Quadro® graphics adaptor from NVIDIA Corporation of America for interfacing with display 210, such as a Hewlett Packard® HPL2445w LCD monitor. A general purpose I/O interface 212 interfaces with a keyboard and/or mouse 214 as well as an optional touch screen panel 216 on or separate from display 210. General purpose I/O interface may also connect to a variety of peripherals 218 including printers and scanners, such as an OfficeJet® or DeskJet® from Hewlett Packard®.

The general purpose storage controller 220 connects the storage medium disk 204 with communication bus 222, which may be an ISA, EISA, VESA, PCI, or similar, for interconnecting all of the components of the computer 226. A description of the general features and functionality of the display 210, keyboard and/or mouse 214, as well as the display controller 208, storage controller 220, network controller 206, and general purpose I/O interface 212 is omitted herein for brevity as these features are known.

Figure 3:
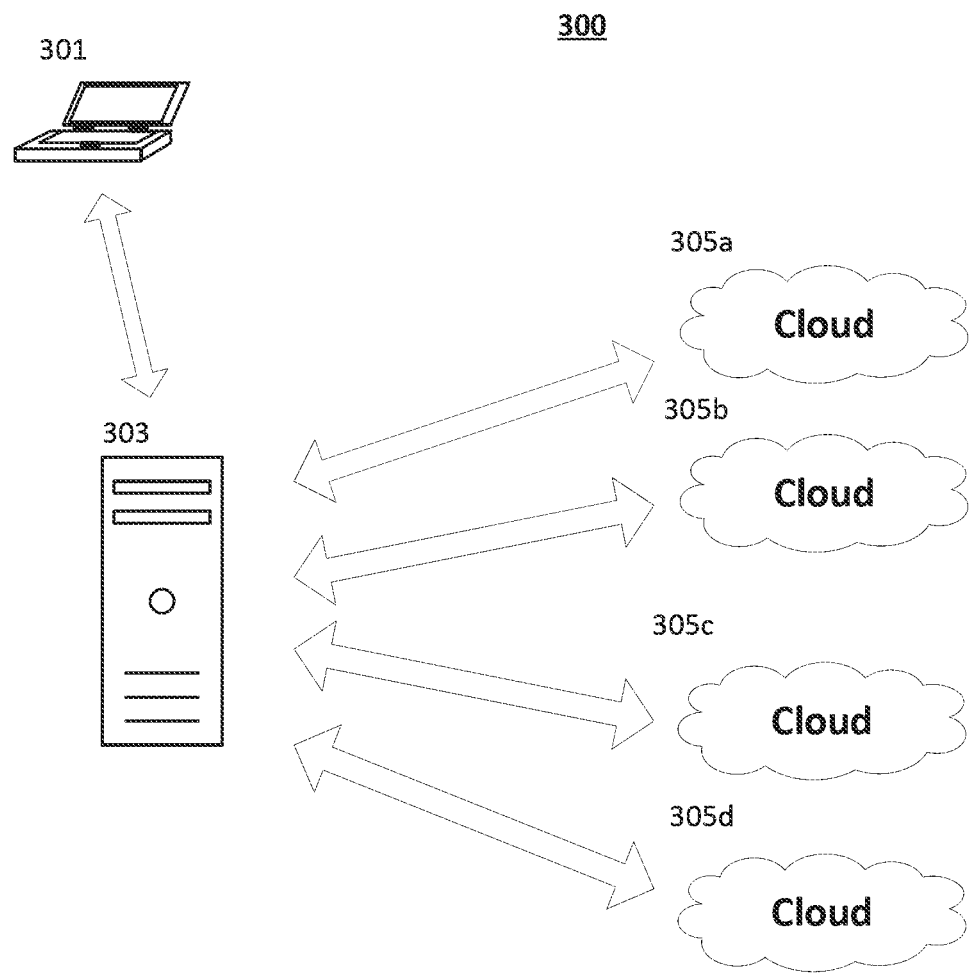
FIG. 3 illustrates a network diagram with multiple clouds in accordance with an exemplary aspect of the disclosure.

FIG. 3 is a network diagram in accordance with an exemplary aspect of the disclosure. In some embodiments, the functions and processes may be implemented on a computer as in FIG. 2 that is configured to communicate with multiple cloud services via a network system. The network system 300 may include at least one client computer 301 and at least one server computer 303, and multiple cloud services 305a, 305b, 305c, 305d. Each of the client computer 301 and the server computer 303 may be implemented as in FIG. 2. Although the diagram shows four cloud services, the number of cloud services in the diagram is for purposes of explanation and is not intended to limit a computer network to the number shown.

The multiple cloud services 305a, 305b, 305c, 305d are preferably independent cloud services and may be of the same type of cloud service, or different types. Each of the cloud services provides on-demand network access to a shared pool of configurable computing resources that can be provisioned with minimal management effort. Each cloud service may be hosted from a location that belongs to a respective service provider. Also, each cloud service is inherently scalable, and can be scaled up or scaled down depending on the amount of resources that are required.

There are a number of types of cloud services. The cloud services 305a, 305b, 305c, 305d may be, but are not limited to, a private cloud, a public cloud, a community private cloud, or a hybrid cloud. One or more of the cloud services 305a, 305b, 305c, 305d may be a private cloud. A private cloud is typically hosted by a private service provider. In some cases, the private cloud may be shared by more than one organization. For example, a group of government agencies may share a government cloud service. In a similar manner, a research university or university system may share a private cloud service. Each private cloud may be accessed by the one or more server computer 303 through one or more private networks and may be limited in scale to a few hundred or a few thousand nodes. Each private cloud may provide protections through security boundaries, as well as low latency network communication, and access to shared resources and data.

Figure 4:
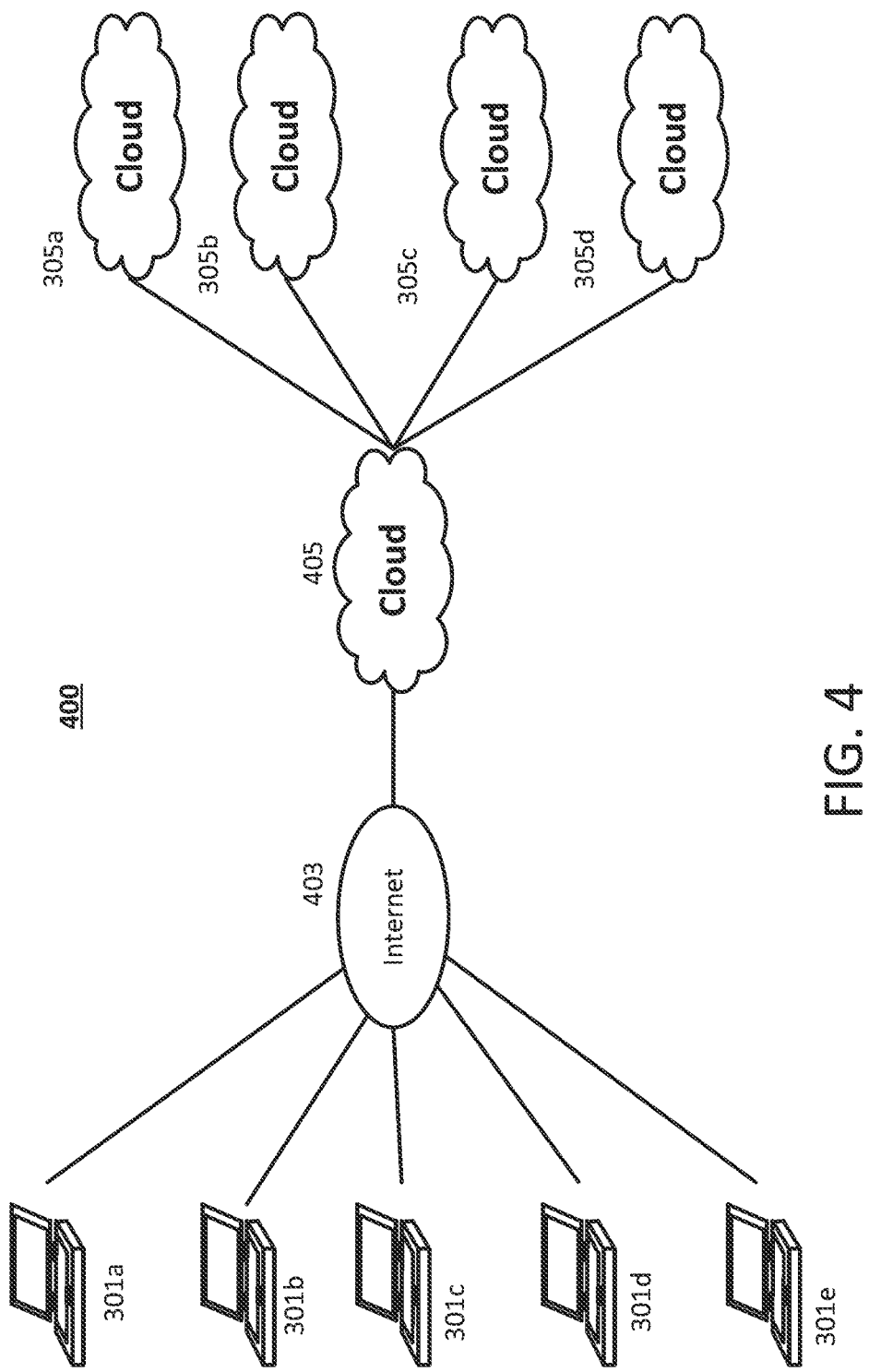
FIG. 4 illustrates a network diagram for multiple clients and multiple clouds in accordance with an exemplary aspect of the disclosure.

One or more of the cloud services 305a, 305b, 305c, 305d may be a public cloud. FIG. 4 illustrates a network diagram for multiple clients and multiple clouds in accordance with an exemplary aspect of the disclosure. A public cloud may be hosted by a service provider that allows sharing of cloud service resources by public users through the public Internet 403. The at least one server computer 303 may be implemented in a public cloud 405. A public cloud may provide various levels of services, including Infrastructure as a Service (IaaS), Platform as a Service (PaaS), and Software as a Service (SaaS). Infrastructure services share physical hardware. Platform services share the same operating system and application framework. Software services share the entire software stack. Google App Engine, Microsoft Azure, and Amazon Web Services may be considered as examples of Platform services. The service provider may provide various security features and control over configuration depending on the particular level of service.

In some cases, an infrastructure provided by a cloud service may include one or more virtual private clouds. Each virtual private cloud may be an extension of a respective private network.

Figure 5:
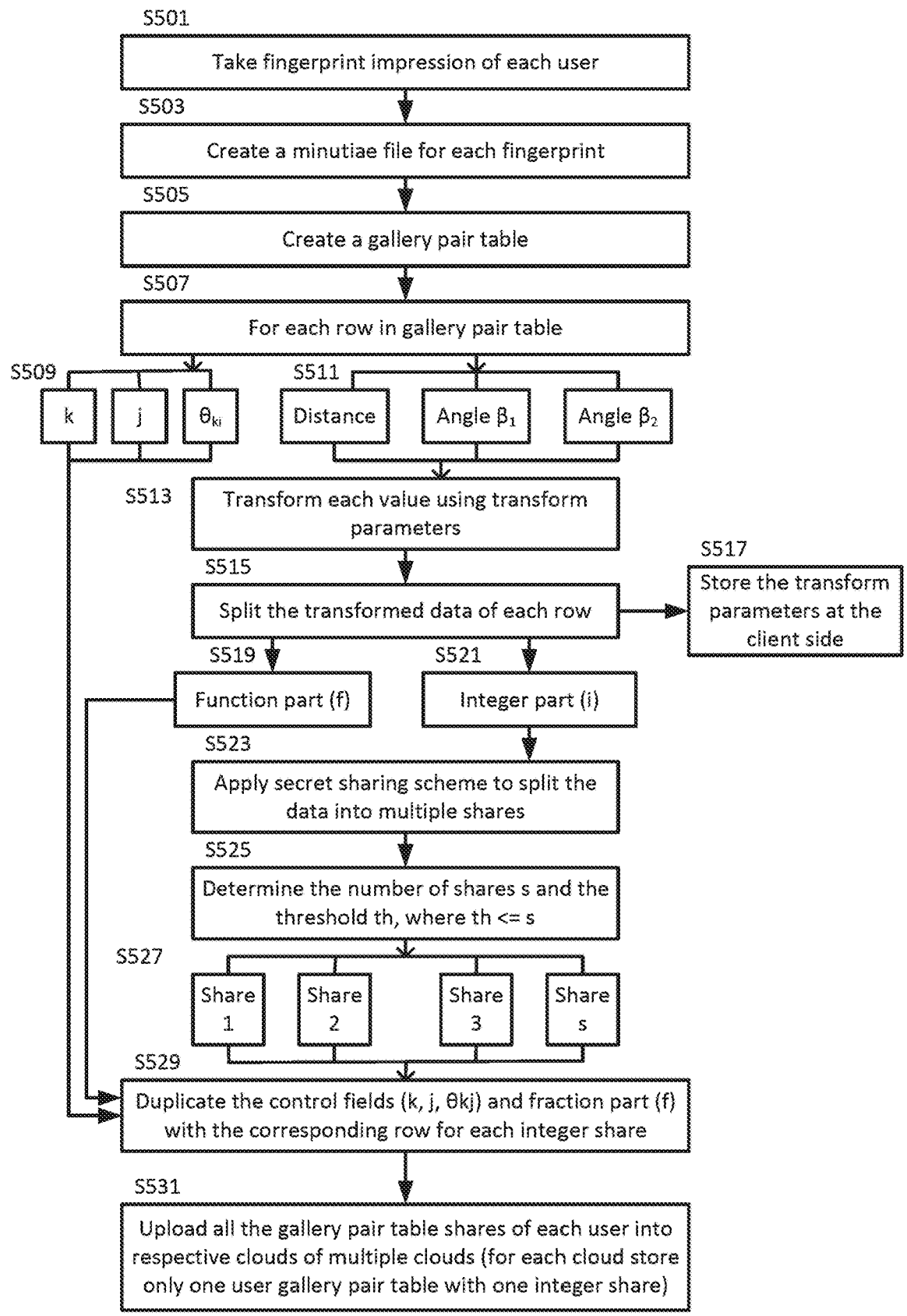
FIG. 5 is a flowchart illustrating the enrollment operation of the algorithm in accordance with an exemplary aspect of the disclosure.
Figure 9:
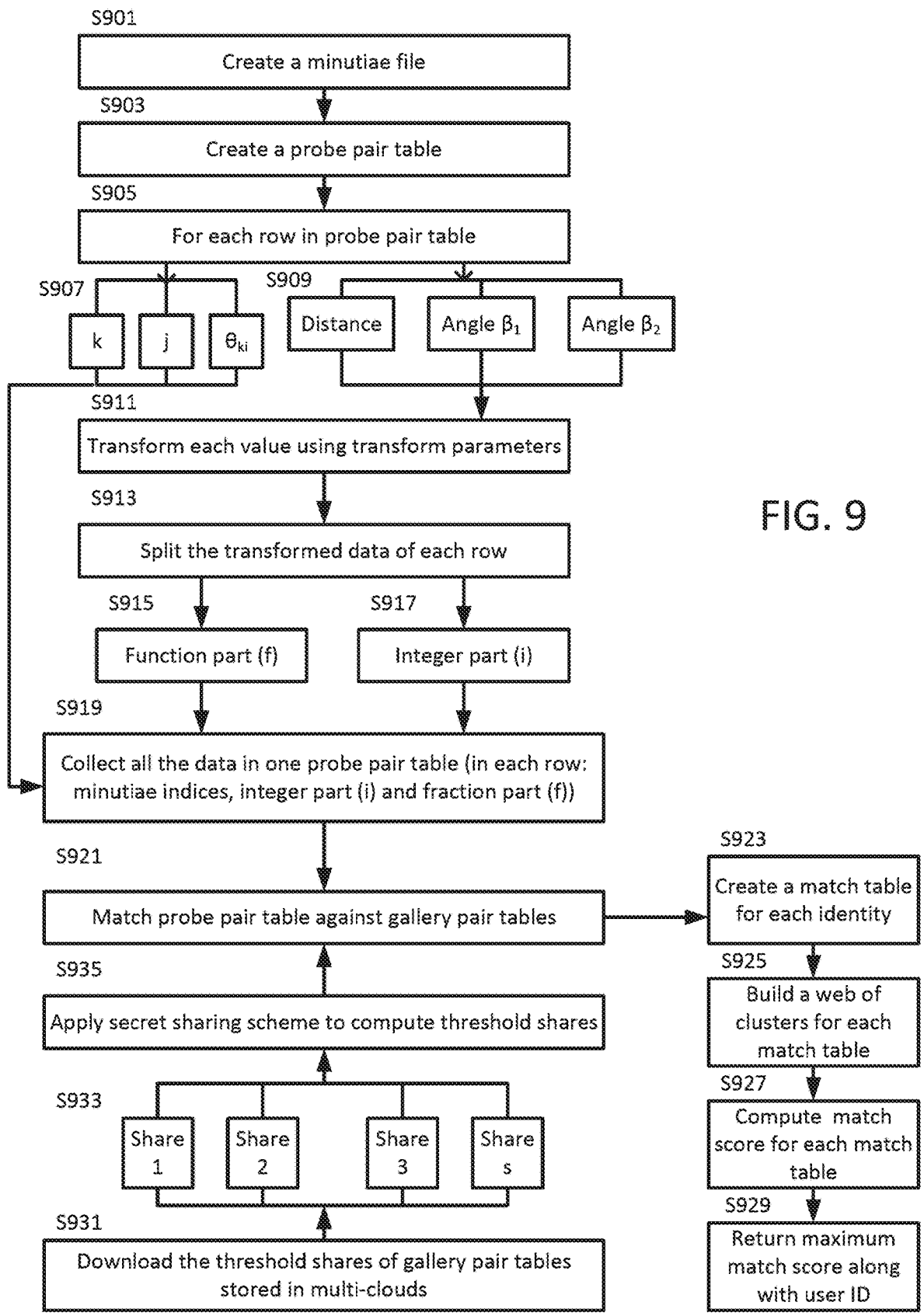
FIG. 9 is a flowchart illustrating the matching operation of the algorithm in accordance with an exemplary aspect of the disclosure.

The functions and processes may be composed of two major operation phases, which are the enrollment and matching operations. FIG. 5 is a flowchart of the enrollment operation phase. After that is the architecture of the matching operation phase which is illustrated in FIG. 9. The enrollment operation involves capturing of the fingerprint images for a large number of persons to generate a gallery pair table for each person. Fingerprint images are captured using a sensor. Enrollment may vary based on the way people put their fingerprints on a scanning surface. The enrollment operation is performed using a revocable transform and a portion of the result of the revocable transform is securely stored in databases in multiple clouds such that a compromised database in up to a threshold number of the multiple clouds will not result in revealing any original fingerprints.

Regarding FIG. 5, in the enrollment phase, in S501, disclosed embodiments take the fingerprint impression of each user and extract fingerprint minutiae points from each user's fingerprint impression image. Fingerprint impressions may be taken using one or more client devices 301. Each user is assigned a unique user ID. In some embodiments, fingerprint impressions may be taken and stored in a temporary storage or a long term memory. The temporary storage is preferably within a local memory device of the client device 301, but may be a removable storage device as long as fingerprint impressions are deleted before the removable storage is dismounted. Similarly, long term memory may include a local solid state memory or hard drive of the client device 301, or may be a remote storage. In some embodiments, fingerprint impressions may be temporarily stored in a cloud service, for example one or more of cloud services 305a, 305b, 305c, 305d. In some embodiments, a number of fingerprint impressions may be taken for each user. For example, finger print impressions may be taken for different fingers of a user, and/or may be taken for slightly different impressions of a finger or fingers. Also, fingerprint impressions may instead be uploaded from a central agency or from various agencies, such as local or federal law enforcement agencies. In some embodiments, a fingerprint impression may be obtained using a user's personal device, such as a fingerprint reader, laptop computer, mobile device, to name a few. The fingerprint impressions for various persons may be taken over a period of time and stored before being used for later steps of the enrollment phase. In some embodiments, fingerprint impressions may be obtained for a group of users to perform the enrollment phase, and then at later times, fingerprint impressions may be obtained for additional users in order to update a previous enrollment phase.

In S503, a minutiae file is generated (see, Table 1.1 above, for example) from the fingerprint minutiae points and then, in S505, the pair table may be generated (see Table 1.2 above, for example) in accordance with the NIST Bozorth algorithm. See C. I. Watson et al. Because the fingerprint data may be received for many persons, the file and table may be centrally generated in a server device or in a service such as server computer 303 or cloud service 405. Further, the later steps of the enrollment phase may be performed by a server computer 303 or cloud service 405.

As mentioned above, while biometrics, in particular fingerprints, can initially improve security, biometric databases may potentially be compromised. Biometric records are increasingly becoming a significant cybertarget. It may be only a matter of time before a major biometric database is compromised. A compromised biometric cannot be replaced. An object is to address privacy concerns of a fingerprint database breach while supporting security goals. A partial solution has been to store only a cancelable token generated from the original biometrics. One approach has been to store a biotoken, which is a revocable identity token produced by applying a revocable transform to biometric data, such that identity matching may be done in an encoded/revocable form. The approach calls for separation of data into two parts, a fractional part, retained for performing a local distance computation, and an integer part. See T. E. Boult, W. J. Scheirer, and R. Woodworth, "Revocable fingerprint biotokens: accuracy and security analysis," in 2007 IEEE Conference on Computer Vision and Pattern Recognition, 2007, pp. 1-8, incorporated herein by reference in its entirety. The present disclosure includes performing a revocable transform to fingerprint data, but storing a result of the transform in a fashion that prevents original fingerprints from being revealed.

In one embodiment, the server computer 303 or cloud service 405 may take each pair of minutiae that are sufficiently close and generate a pair table entry for them. Each pair table entry may store information including distance between the pair, the angles of each minutia with respect to the line connecting them, the overall orientation of the line connecting them, the overall orientation of the line connecting them and the indexes of the point in the pair. The information is divided into parameter data and information that undergoes a transformation. The information that undergoes a transformation is transformed and split into the fractional part and the integer part. This transformation approach is such that even if both the transformed data and the information as parameters are compromised, there is no practical way to recover the original data.

In particular, in S507, for each given row in the pair table, in S509, three bytes of control fields (k, j, $\theta_{kj}$) are temporarily stored as parameters, and, in S511, another three fields (distance $d_{kj}$, angle $\beta_1$, angle $\beta_2$) are temporarily stored as information to be transformed. In some embodiments, the three bytes of control fields may be maintained as is without being encoded and protected. In some embodiments, the other three fields are preferably encoded and protected. In order to provide a first layer of protection, in S513, values of each of these other three fields may be transformed via the transformation formula $$v'=(v-t)*s$$

where v is each of the three biometric inputs ($d_{kj}$, $\beta_1$, $\beta_2$), s is a scaling value and t is a translation.

The choice of values for these transform parameters may be dependent on the biometric data of the particular person. In one embodiment, each person may have a number of separate transforms. A transform is chosen based on an initial pairwise distance ($d_{kj}$). A translation t for a transform is determined by generating a random number. The scale s is mapped into an interval that is at least as large as the full range of input data. In particular, the scale value s may be determined by the expected range of minutiae values and sensor resolution. It is preferred that the scale value s be larger than the actual variations of the input data for that user, to ensure overlap and aliasing.

After determining the transform v' for each of the three biometric inputs, in S515, the data v' of each of the biometric inputs are each separated into two parts: a stable part (an integer part i of v') and a fraction part (residual f of v'). In one embodiment, a data v' is separated into two parts, a quotient part and a residual. The residual of the fraction may be determined by using a modulus-like operation. The modulus-like operation may be defined for a window of size E (which represents the range of variations in v). In the two parts, the quotient is an integer (int(v'/E) and the residual of the fraction depends on the size of E. The residual of the fraction may be defined as rmod(v', E)=x if x<E, and rmod(v', E)=(E*2)−x otherwise. In S521, the three integers for each of the three biometric inputs of the stable part are combined into a single integer. The combined single integer may be, for example, a 4 bytes integer. In S519, the three residuals of the fraction part are combined as well. The stable part may not vary even when the basic fingerprint data suffer from some natural variation. The stable part determines the original positional information that must exactly match in the matching phase, thus defining a window for robust computation. In order to protect the original positional data and to provide strong security, in one embodiment the stable part (i.e., combined integer) is encrypted. The fraction part, which may not be encoded, preferably has a value that is within the window in which the local distance can be computed. In other words, the residual of the fraction part is preferably within a threshold, which is based on the range of variations in v).

To protect the biometric data, even if the transformed information are disclosed, it has been determined that the combined integer value (stable part) must be guaranteed to be cryptographically secure. As discussed below, this combined integer value will be used for fingerprint matching. One approach has been to apply one-way or cryptographic transform of the stable part to provide an encrypted part of the position information, thus hiding the original positional data. In some embodiments the combined integer value is encrypted to protect the original positional data. The fraction part value is preferably within the window in which the local distance can be computed. However, encrypting the stable part may not be sufficient. Also, typical security methods applied to content data will encrypt the content data with an encryption key. In such cases, securing the encryption keys requires a different method from encryption when the content data is encrypted. A secret sharing scheme has been proposed which divides data into n pieces in such a way that the data is reconstructable from any k pieces, but knowledge of k−1 pieces does not reveal information about the data. See A. Shamir, "How to share a secret," *Commun. ACM*, vol. 22, no. 11, pp. 612-613, 1979, incorporated herein by reference in its entirety. This secret sharing scheme is based on polynomial interpolation. To divide the data into pieces, a random k−1 degree polynomial is chosen. Using this secret sharing scheme even if k−1 pieces of the n pieces are revealed to an opponent, an opponent cannot deduce information about the real value of the original data. In particular, to secure the combined integer value, in S523, a secret-sharing scheme is applied to split the integer value into multiple shares. In S525, the number of shares s to recover the value back and the threshold th is determined, where th<=s. In S527, each of s shares of the integer value are temporarily stored. Further, in S529, the control fields (k, j, θkj) and fraction part (f) are duplicated and stored with the corresponding row for each share to form distributed gallery pair tables. In one embodiment, each row of a share of a gallery pair table includes a pair, minutiae indices k, minutiae indices j, angle θkj, fraction part f, and one share of the respective integer value. Then, in S531, each gallery pair table with a respective integer value share are separately uploaded into corresponding clouds among multiple clouds. Only one share of the integer values is stored in each cloud. Furthermore, in S517, in some embodiments the transform parameters of the user(s) may also be stored at the client side, 301, to enhance the security level.

Figure 6:
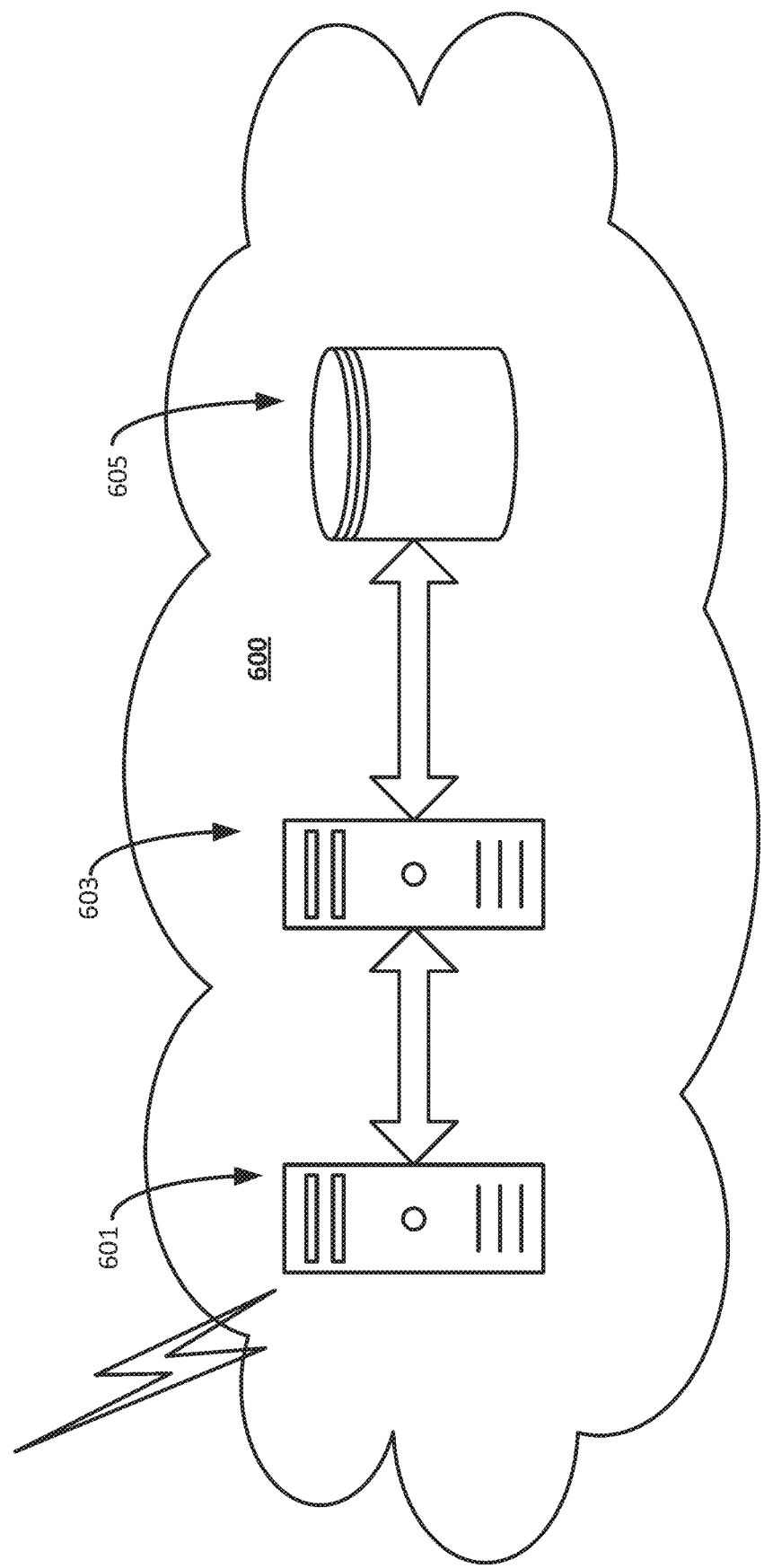
FIG. 6 illustrates a data storage arrangement in a cloud service in accordance with an exemplary aspect of the disclosure.

FIG. 6 illustrates a data storage arrangement in cloud service in accordance with an exemplary aspect of the disclosure. Although the figure depicts an arrangement of physical devices, a cloud service may provide a virtual infrastructure in which several virtual devices may share one or more networked physical devices. The one or more networked physical devices may be loosely coupled with the virtual devices such that the virtual devices may exist on different physical devices at different time periods. To provide data storage, a cloud service 600 may be configured to include a forward facing service 601 which provides an interface to the cloud service 600. The forward facing service 601 may be a Web server hosting a Web site or a Web application, or may be a server side of a client-server application. The forward facing service 601 may be configured to access a database server 603 that performs database management operations on a database storage system 605. Both the database server 603 and database storage system 605 may be performed on more than one physical device in the cloud service 600.

Figure 7:
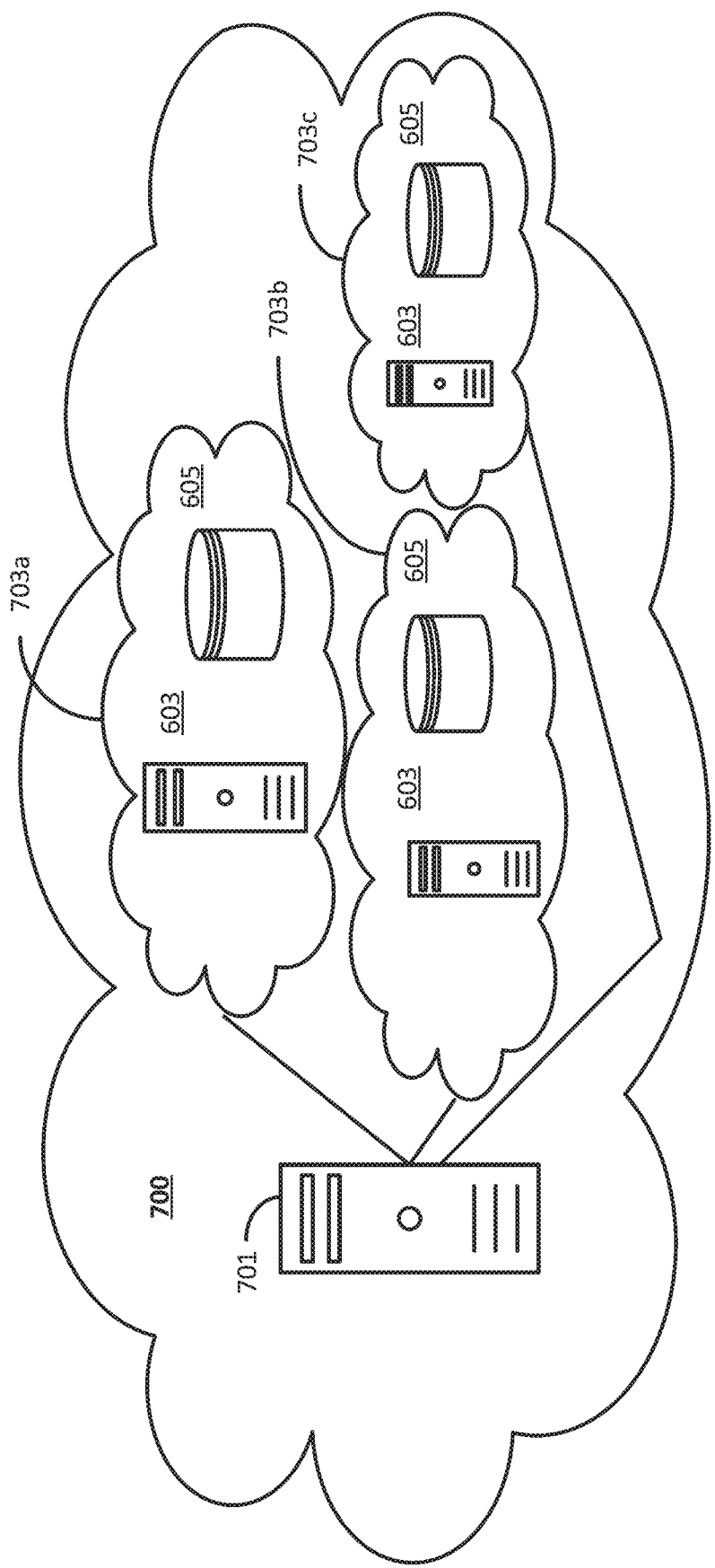
FIG. 7 illustrates multiple virtual clouds in accordance with an exemplary aspect of the disclosure.

FIG. 7 illustrates multiple virtual clouds in accordance with an exemplary aspect of the disclosure. In some embodiments, one or more of the cloud services 305*a*, 305*b*, 305*c*, 305*d* may themselves be virtual clouds 703*a*, 703*b*, 703*c* in a larger cloud service 700. In some embodiments, storage operations may be performed under the control of a front end server 701. Each virtual cloud may be configured with a database management system having a database server 603 and associated database storage system 605.

In an embodiment, each cloud service stores an integer share value and a gallery pair table(s). There may be multiple gallery pair tables, one for each person that fingerprints have been taken, and a copy of a person's gallery pair table for each integer share. Subsequently, the gallery pair table(s) can potentially have a large amount of data that must be stored and retrieved. Preferably, the gallery pair table(s) are configured to be retrieved from the cloud service for matching against a probe pair table. The gallery pair table(s) may be stored in one of several different ways depending on the amount of data that is expected to be stored. For example, a gallery pair table(s) may be stored as a single object, or stored as table elements in a logical database table.

Figure 8:
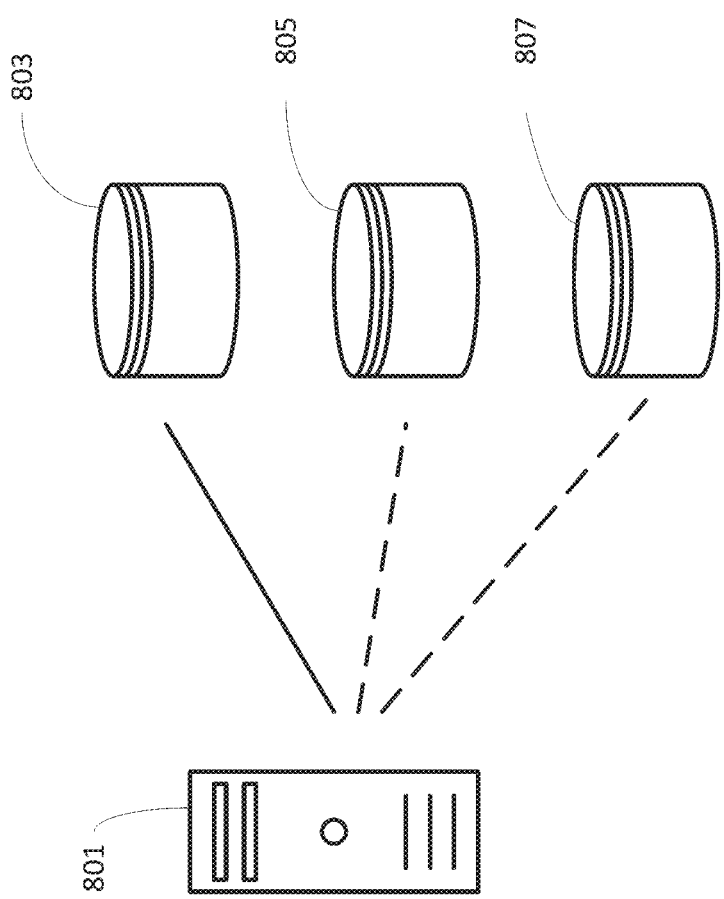
FIG. 8 illustrates a database server arrangement in accordance with an exemplary aspect of the disclosure.

FIG. 8 illustrates a database management system arrangement in accordance with an exemplary aspect of the disclosure. One of the multiple cloud services may be configured with one of several types of data storage types 803, 805, 807 accessible by a database server 801. In some embodiments, different cloud services may be configured with different data storage arrangements. For example, some cloud services, such as private cloud services, may offer only limited types of data storage, or may offer only certain secure data storage facilities for particular types of data storage.

Subsequently, each gallery pair table(s) may be stored in various cloud services as a block of data in a file system, an object in an external storage service, or may be stored as individual table elements in a database format, such as a relational database depending on the database services provided by each cloud service.

In some embodiments, a share of a gallery pair table(s) and integer share value may be stored in a distributed file system provided in a cloud service. In this arrangement, the entire share of a gallery pair table(s) may be stored and retrieved as a block of data in a file, as needed. An example of a distributed file system is Google BigTable which may be configured to store a share of a gallery pair table(s) that is as large as petabytes in size.

In some embodiments, when the size of the gallery pair table is a few terabytes or less, a gallery pair table and integer share value may be stored in an external storage service in a cloud service. External storage services such as Google storage and Amazon Simple Storage Service have a simplified structure. Objects are simply retrieved based on a unique key. In particular, the share of the gallery pair table may be stored as a single object in a bucket and retrieved using a unique key.

An external storage service may include features to improve retrieval speed and security as well as other useful features. Objects in an external storage service may be stored in a region which optimizes latency. Rights can be granted and an authentication mechanism may be provided to ensure that the table data is kept secure from unauthorized access. In some embodiments, an object may be versioned such that previous instances of an object are preserved, and may be retrieved. In particular, the single object containing the share of the gallery pair table may be stored in a dedicated region instead of being distributed throughout a shared memory management system. Rights to retrieve the object may be configured to require authentication. As more fingerprint data is obtained for the gallery pair table, a new version of the share of the gallery pair table may be stored, or at least versioning may be assigned so that previous versions of the gallery pair table may continue to be available.

In some embodiments, a cloud storage may be configured as a relational database management system. Each row of the gallery pair table may be stored as a row of a relational table. The relational database system offers mechanisms for data integrity. The gallery pair table may be stored in a relational table when the number of people that access the system is limited. The cloud service may be configured to use an SQL service, which allows for flexibility to scale computational resources and storage. As relational database systems have primarily been used for transaction processing, in some embodiments, alternative data structures may be used such as data dictionaries and hash tables to store a large gallery pair table(s) that may need to be accessed by a large number of users.

Regarding FIG. 9, in the matching operation phase, in some embodiments the same procedures as in the enrollment phase are followed in order to create the probe pair table to compare it with the threshold gallery pair tables stored in the multiple clouds. The matching process is performed such that a threshold number of shares of gallery pair tables is required in order to perform the match operation, where a fewer number than the threshold number of shares would not reveal fingerprint data. The user's probe pair table is created in a secure manner and may be created in a client computer, server computer, or in a cloud service. In some embodiments, initial steps of the matching operation phase may be performed in the client computer, 301. The client computer may be a device that the user wishes to gain access and that uses a fingerprint of the user for authentication, aside from a password or as part of a two factor authentication process. Alternatively, the client computer may be a device for obtaining a fingerprint of a person for purposes of identification. In S901, S903, S905, the client computer 301 takes a probe fingerprint image and creates a probe pair table. In S907, S909, S911, S913 the client computer 301 performs a transform operation on the rows of the probe pair table, in a similar manner as in the enrollment operation. Once the integer, S917, and fraction values, S915, are created, in S919, the matching operation phase collects all rows in the probe pair table, where each row consists of minutiae indices k and j, integer part (i) and fraction part (f). After that, the matching operation phase sends the probe pair table to the server computer, 303 or cloud service 405, in S921, in order to do the matching process. The probe pair table is downloaded to the server computer 303 or cloud service 405 over a secure channel, or itself may be downloaded using an encryption protocol.

The matching process may be performed in the server computer 303 or in a cloud service 405. In S931, the matching process includes securely accessing multiple cloud storages 305*a*, 305*b*, 305*c*, 305*d*, at least equal to the threshold and downloading threshold shares of gallery pair tables S933. The matching process requires knowledge of the address and authentication process of each of the multiple cloud storages that store the shares. Also, different cloud services may require different authentication criteria for gaining access. In some embodiments, address information and authentication credentials for the multiple cloud storages that store the shares may be maintained by an administrator or administration process set up by the organization that is responsible for the fingerprint identification system.

After that, in S935, the matching process uses the secret sharing scheme to reconstruct the integer part value from the threshold number of shares. Thus, the matching process cannot be performed without knowledge of the secret sharing scheme.

In particular, the secret sharing scheme may be used to reconstruct the integer part value. The secret sharing scheme is initially performed by dividing data D into n pieces, such that:

Knowing any of K or more Di pieces makes D easily computable;

Knowing any of K−1 or fewer Di pieces leaves D completely undetermined.

When using (k,n) threshold scheme, there are n pieces, and any k of them can reconstruct the secret.

Subsequently, to reconstruct the integer part, a Polynomial Interpolation of secret sharing scheme is used as follows:

Choose the degree k−1 of the polynomial

Set the coefficient a0 equal to the secret to be shared.

Randomly choose k−1 coefficients a1, a2, . . . , ak−1

The polynomial is:

f(x)=ak−1xk−1+ak−2xk−2+ . . . +a1x1+a0

Select at least k values of f(x) at distinct x's

These k points (x,f(x)) can be used to reconstruct the polynomial and recover a0 which is equal to the secret.

If the integer part can be reconstructed using the secret sharing scheme, in S921, the matching process matches probe pair table against gallery pair table shares and, in S923, creates a match table for each identity, where each identity means for each one fingerprint (each person) there is one match table. The matching process is such that a row in the gallery pair table matches a row in the probe pair table if the corresponding integer part values are identical and if the fraction parts are within the fraction part threshold. Each row of the match table consists of two probe minutiae points, two gallery minutiae points and difference angles between probe angle $\theta_{kj}$ and gallery angle $\theta_{kj}$. Once all the match tables are created, in S925, the matching process traverses and links the rows into a web of clusters that has a consistent minutiae pair in each cluster. As an example, for each probe minutiae pair there may be only one corresponding gallery minutiae pair.

In S927, the matching process then merges the compatible clusters in order to compute the match score for each cluster. After computing the match score for each identity, in S929, the matching process returns only the maximum match score along with a user ID. In such case, no fingerprint data is revealed as a result of the matching process.

Numerous modifications and variations of the present invention are possible in light of the above teachings. It is therefore to be understood that within the scope of the appended claims, the invention may be practiced otherwise than as specifically described herein.

The invention claimed is:

1. A secure fingerprint identification method, comprising:
storing n shares of original transformed gallery pair tables for each of one or more persons into n cloud computer systems, where n is a natural number of one or more, each of the original transformed gallery pair tables is generated using a client computer including:
creating fingerprint minutiae points based on a person's fingerprint,
for each row in the original transformed gallery pair table, obtaining a first biometric input v, defined as a distance d between a minutiae pair and angles $B_1$ and $B_2$ of each pair of minutiae points,
transforming the first biometric input v into first transformed data v' using transform parameters,
determining an integer quotient part and a residual of a fraction part using the first transformed data v',
applying a secret-sharing scheme to the integer quotient part that splits the integer quotient part into the n shares and determines a threshold number of shares, and
inserting one share of the integer quotient part into the respective row of one share of the original transformed gallery pair table;
collecting, with a user's computer, data for a probe pair table;
generating, with the user's computer, the probe pair table including:
for each row in the probe pair table,
obtaining a second biometric input v, defined as distance d between minutiae pair and angles $B_1$ and $B_2$ of each pair of minutiae points,
transforming the second biometric input v into second transformed data v' using the transform parameters,
determining a probe integer quotient part and a probe fraction part using the second transformed data v;
downloading the threshold number of the n shares of the transformed gallery pair tables for each of the one or more persons stored in the n clouds;
applying, using a server computer, the secret-sharing scheme to reconstruct the integer quotient part from the threshold number of shares of the integer quotient part; and
matching, using the server computer, the probe pair table against the transformed gallery pair tables for the one or more persons, including exactly matching the probe integer quotient part and the reconstructed integer quotient part, wherein a match with one person's gallery pair table identifies the user's fingerprint.

2. The method of claim 1, further comprising, after determining the integer quotient part for the first transformed data v', encrypting the integer quotient part, and applying the secret-sharing scheme to the encrypted integer quotient part that splits the encrypted integer quotient part into the n shares.

3. The method of claim 2, wherein the storing n shares of the original transformed gallery pair tables includes inserting n shares of the split encrypted integer quotient part into rows of the original transformed gallery pair tables.

4. The method of claim 1, wherein the matching the probe pair table against the transformed gallery pair tables by the server computer comprises:
creating a match table for each identity;
building a web of clusters for each match table;
computing a match score for each match table; and
returning a maximum match score along with a user ID.

5. The method of claim 4, wherein the creating the match table includes matching a row in the probe pair table and a row in the transformed gallery pair table if the probe integer quotient part and the reconstructed integer quotient part are identical and if the residual of the fraction parts are within a threshold.

6. The method of claim 1, wherein the transforming using the client computer is (v−t)*s, where v is distance d between minutiae pair and angles $B_1$ and $B_2$, and the transform parameters include translation t and scale s.

7. The method of claim 6, further comprising storing the transform parameters at the client computer.

8. The method of claim 6, wherein the client computer generates a random number for determining the translation t, and determines the scale value s based on the expected range of minutiae values.

9. The method of claim 1, wherein the generating the original gallery pair table for each of the one or more persons further includes duplicating control fields, including minutiae pairs and orientation (k, j, θkj) in each row of the gallery pair table and the residual of the fraction part (f) with the corresponding row in each share.

10. The method of claim 1, wherein the storing n shares of the original transformed gallery pair tables includes storing at least one of the n shares of transformed gallery pair tables in corresponding at least one private cloud service.

11. A secure fingerprint identification system, comprising:
n cloud computer systems storing n shares of original transformed gallery pair tables for each of one or more persons;
a client computer configured to
create the original transformed gallery pair table based on a minutiae file for each person's fingerprint of the one or more persons,
for each row in the original transformed gallery pair table, obtain a first biometric input v, defined as distance d between a minutiae pair and angles $B_1$ and $B_2$ of each minutiae pair,
transform each first biometric input v into first transformed data v' using transform parameters,
determine an integer quotient part and a residual of a fraction part using the first transformed data v'; and
a server computer configured to, for each row of the original transformed gallery pair table,
apply a secret-sharing scheme to the integer quotient part that splits the integer quotient part into the n shares and determines a threshold number of shares, and
insert one share of the integer quotient part into a respective row of one share of the original transformed gallery pair table;
a user's computer collecting data for one probe pair table including an integer part and a fraction part,
the probe pair table is generated using the user's computer by:
for each row in probe pair table,
obtaining a second biometric input v, defined as distance d between minutiae pair and angles $B_1$ and $B_2$ of each minutiae pair, and
transforming each second biometric input v into second transformed data v' using transform parameters, and
determining a probe integer quotient part and a probe fraction part using the second transformed data v';
the server computer downloading the threshold number of the n shares of the original transformed gallery pair tables for each of the one or more persons stored in the n clouds;
applying the secret-sharing scheme to reconstruct the integer quotient part from the threshold number of shares of the integer quotient part; and
matching the probe pair table against the gallery pair tables for the one or more persons, exactly matching the probe integer quotient part and the reconstructed integer quotient part, wherein a match with one person's gallery pair table identifies the user's fingerprint.

12. The system of claim 11, further comprising, after determining the integer quotient part for the first transformed data v', the client computer is configured to
encrypt the integer quotient part, and
apply a secret-sharing scheme to the encrypted integer quotient part that splits the encrypted integer quotient part into the n shares.

13. The system of claim 12, wherein the server computer is configured to store n shares of the original transformed gallery pair tables including inserting n shares of the split encrypted integer quotient part into rows of the original transformed gallery pair tables.

14. The system of claim 11, wherein the server computer matching the probe pair table against the transformed gallery pair tables comprises:
creating a match table for each identity;
building a web of clusters for each match table;
computing a match score for each match table; and
return maximum match score along with a user ID.

15. The system of claim 14, wherein the server computer creating the match table includes matching a row in the probe pair table and a row in the transformed gallery pair table if the probe integer quotient part and the reconstructed integer quotient part are identical and if the residual of the fraction parts are within a threshold.

16. The system of claim 11, wherein the transforming by the client computer is (v−t)*s, where v is distance d between minutiae pair and angles B1 and B2, and the transform parameters include translation t and scale s.

17. The system of claim 16, wherein the client computer is configured to store the transform parameters.

18. The system of claim 11, wherein the client computer is configured to determine a random number for determining the translation t, and determine the scale value s based on the expected range of minutiae values.

19. The system of claim 11, wherein the server computer is configured to generate the original transformed gallery pair table for each of the one or more persons including duplicating control fields, including minutiae pairs and orientation (k, j, θkj) in each row of the gallery pair table and the fraction part (f) with the corresponding row in each share.

20. The system of claim 11, wherein the server computer is configured to store n shares of the original transformed gallery pair tables including storing at least one of the n shares of transformed gallery pair tables in corresponding at least one private cloud service.

* * * * *